(12) United States Patent
Lund

(10) Patent No.: US 12,145,695 B2
(45) Date of Patent: Nov. 19, 2024

(54) SUPPORT VESSEL FOR ASSISTING IN LOADING FLUID HYDROCARBON CARGO ONTO A CARRIER VESSEL, AND RELATED SYSTEM AND METHOD

(71) Applicant: Vaholmen VOC Recovery AS, Grimstad (NO)

(72) Inventor: Alexander Lund, Grimstad (NO)

(73) Assignee: Vaholmen Voc Recovery AS, Grimstad (NO)

( * ) Notice: Subject to any disclaimer, the term of this patent is extended or adjusted under 35 U.S.C. 154(b) by 253 days.

(21) Appl. No.: 17/615,190

(22) PCT Filed: Jan. 19, 2021

(86) PCT No.: PCT/NO2021/050012
§ 371 (c)(1),
(2) Date: Nov. 30, 2021

(87) PCT Pub. No.: WO2021/150119
PCT Pub. Date: Jul. 29, 2021

(65) Prior Publication Data
US 2022/0348294 A1  Nov. 3, 2022

(30) Foreign Application Priority Data
Jan. 21, 2020  (NO) .................................. 20200076

(51) Int. Cl.
*B63B 27/34* (2006.01)
*B63B 27/25* (2006.01)
(Continued)

(52) U.S. Cl.
CPC .............. *B63B 27/34* (2013.01); *B63B 27/25* (2013.01); *B63H 25/04* (2013.01); *B67D 9/02* (2013.01)

(58) Field of Classification Search
CPC ......... B63B 27/25; B63B 27/24; B63B 27/30; B63B 27/34; B63B 25/04; B63B 25/08;
(Continued)

(56) References Cited

U.S. PATENT DOCUMENTS 3,746,060 A * 7/1973 Janssen ..................... B67D 9/02
14/71.1
4,064,820 A * 12/1977 Vogt ...................... B63B 22/021
137/355.16
(Continued)

FOREIGN PATENT DOCUMENTS

| CN | 105324300 | 2/2016 |
| CN | 107000816 | 8/2017 |

(Continued)

OTHER PUBLICATIONS

Norwegian Search Report for NO 20200076, dated Aug. 20, 2020.
(Continued)

*Primary Examiner* — Daniel V Venne
(74) *Attorney, Agent, or Firm* — Andrus Intellectual Property Law, LLP

(57) ABSTRACT

A method, and a support vessel for use in the system. The system can in various embodiments include: a carrier vessel for carrying fluid hydrocarbon cargo across sea, the hydrocarbon cargo to be loaded into at least one cargo tank of the vessel; a support vessel; VOC recovery means on the support vessel for recovering volatile organic compounds, VOCs, the VOCs being produced from the cargo tank in loading the cargo tank, in use; and at least one hose extending between the carrier vessel and the support vessel for communicating gas having volatile organic compounds, VOCs, through the hose from the cargo tank of the carrier vessel to the VOC recovery means on the support vessel.

20 Claims, 3 Drawing Sheets

(51) Int. Cl.
*B63H 25/04* (2006.01)
*B67D 9/02* (2010.01)

(58) Field of Classification Search
CPC ...... B63B 25/12; B01D 53/00; B01D 53/002;
B01D 2257/708; B01D 2259/4516; B01D
2259/4525; B67D 9/02; B65D 90/30;
Y02T 70/00
USPC .................. 114/72, 73, 74 R, 230.1, 232
See application file for complete search history.

(56) References Cited

U.S. PATENT DOCUMENTS

| | | | |
|---|---|---|---|
| 6,412,433 | B1 | 7/2002 | Breivik et al. |
| 9,260,164 | B2 | 2/2016 | Dupont |
| 10,668,989 | B2 * | 6/2020 | Hellesmark ......... B63B 17/0027 |
| 2007/0289517 | A1 | 12/2007 | Poldervaart et al. |
| 2008/0295526 | A1 | 12/2008 | Boatman et al. |
| 2012/0037240 | A1 | 2/2012 | Adkins et al. |

FOREIGN PATENT DOCUMENTS

| | | |
|---|---|---|
| EP | 2489585 | 8/2012 |
| EP | 3825222 | 5/2021 |
| KR | 101291352 | 7/2013 |
| KR | 101336166 | 12/2013 |
| KR | 101399999 | 5/2014 |
| KR | 1020140096446 | 8/2014 |
| KR | 101486766 | 2/2015 |
| KR | 1020180012466 | 2/2018 |
| NO | 20052217 | 5/2005 |
| WO | 9833026 | 7/1998 |
| WO | 9938761 | 8/1999 |
| WO | 2014030923 | 2/2014 |
| WO | 2019017796 | 1/2019 |

OTHER PUBLICATIONS

The International Search and Written Opinion for PCT/NO2021/050012, dated Mar. 25, 2021.
Chinese Office Action and Search Report issued in CN Application No. 2021800050278, date Aug. 28, 2023.
Interantional Search Report in corresponding Application No. PCT/KR2019/007468 mailed Sep. 25, 2019.
JFE Engineering Corporation (2013) "Tanker Vapor Recovery System" brochure.

* cited by examiner

SUPPORT VESSEL FOR ASSISTING IN LOADING FLUID HYDROCARBON CARGO ONTO A CARRIER VESSEL, AND RELATED SYSTEM AND METHOD

CROSS-REFERENCE TO RELATED APPLICATIONS

This application is the U.S. national stage application of International Application PCT/NO2021/050012, filed Jan. 19, 2021, which international application was published on Jul. 29, 2021, as International Publication WO 2021/150119 in the English language. The International Application claims priority of Norwegian Patent Application No. 20200076, filed Jan. 21, 2020. The international application and Norwegian application are both incorporated herein by reference, in entirety.

TECHNICAL FIELD

The present invention relates to marine loading operations, and in particular relates to the loading of fluid hydrocarbon cargo onto carrier vessels, e.g. the loading of crude oil onto oil tankers, and the handling of VOC gases in connection with that.

BACKGROUND

Produced hydrocarbon fluid, for example crude oil or other fluid hydrocarbon cargo, are often carried on tanker vessels across the sea. In many cases, the tanker vessels are high-capacity carrier vessels intended to transport the fluid product long distances.

In order to load fluid cargo onto the tanker vessel, a hose may be connected to the vessel and the fluid cargo is sent through the hose into the tanks of the vessel.

Normally when filling the tanks of a carrier vessel with crude oil, gases including Volatile Organic Compounds (VOC) are released from the oil, e.g. VOC vapour released from the crude oil because of the prevailing temperature and pressure conditions. VOC gases are often also present in residual amounts in the atmosphere of "empty" tanks. The VOC gas is displaced from the tank during filling. Traditionally, the VOC gas is then vented and released into the Earth's atmosphere.

The emission of VOC gases into the Earth's atmosphere is problematic in that it can be environmentally damaging. In some areas, such as on the Norwegian Continental Shelf (NCS), conditions have been issued prohibiting emissions of VOC gases. The existing solution to this for tankers transporting crude oil in the North Sea is currently to fit a VOC process plant on the tanker. The processing plant then recovers the gas and stores components of the gas as liquid which then can be discharged, thereby avoiding emission of the gas into the atmosphere.

However, fitting suitable VOC process plants can be technically complex and expensive, and the inventors have noted that the existing solution can be inconvenient, inefficient and time consuming to scale up for the world fleet of tankers and meet the demands for handling VOC gases. There is a need for solutions which can better address these issues.

At least one aim of the invention is otherwise to obviate or mitigate one or more drawbacks of prior art solutions.

SUMMARY OF THE INVENTION

According to a first aspect of the invention, there is provided a system comprising: a carrier vessel for carrying fluid hydrocarbon cargo across sea, the hydrocarbon cargo to be loaded into at least one cargo tank of the vessel; a support vessel; VOC recovery means on the support vessel for recovering volatile organic compounds, VOCs, the VOCs being produced from the cargo tank in loading the cargo tank, in use; and at least one hose extending between the carrier vessel and the support vessel for communicating gas comprising volatile organic compounds, VOCs, through the hose from the cargo tank of the carrier vessel to the VOC recovery means on the support vessel.

Preferably, the support vessel has a dynamic positioning system, more preferably a DP2 system. By way of the dynamic positioning system, the support vessel may be positioned with respect to the carrier vessel. The support vessel may have propellers or thrusters which may operate under control of the dynamic positioning system for obtaining a desired heading and/or distance away from the carrier vessel. By way of the dynamic positioning, the support vessel may advantageously be kept in desired position and heading relative to the carrier vessel in the presence of forces imparted by waves, wind and current against the carrier vessel or in a case of the carrier vessel rotating or that weathervanes when moored. In particular, the dynamic positioning system may operate to keep the support vessel in position relative to the carrier vessel and/or keep the support vessel spaced apart in the water from the carrier vessel, e.g. by at least a predetermined distance or spacing. The support vessel may be kept in position by operation of the dynamic positioning system so that the distance between the support vessel and the carrier vessel by which they are spaced apart may be kept within a predefined range of allowable distances.

Typically, the support vessel is a platform supply vessel, PSV. Alternatively, the support vessel may be a gas carrier e.g. built from new, and equipped with the dynamic positioning system. The system may further comprise an offshore mooring, wherein the carrier vessel may be moored to the mooring. The mooring may comprise a single point mooring. The vessel may be arranged to weathervane about the mooring. The vessel may be bow-moored to the mooring. Alternatively, the mooring may for example comprise a Sea Island or regular berth.

The carrier vessel may typically be a crude oil carrier, e.g. an tanker, and the fluid hydrocarbon cargo may then typically comprise crude oil.

The VOC recovery means may typically comprise a VOC processing facility onboard the support vessel for processing the VOCs from the supplied gas. The VOC recovery means may further comprise at least one storage tank for storing liquid comprising VOCs. The VOC processing facility is configured to liquefy the VOCs from the gas to obtain a liquid comprising liquefied VOCs. In this way, the support vessel may be certified for transport of liquid in the storage tank, and may conveniently sail to shore to discharge the VOCs from the tank.

According to a second aspect of the invention, there is provided a support vessel for assisting in loading fluid hydrocarbon cargo into at least one cargo tank of a carrier vessel, the carrier vessel to transport the loaded fluid hydrocarbon cargo across sea, the support vessel comprising onboard VOC recovery means for recovering volatile organic compounds, VOCs, the VOCs being produced from the cargo tank in loading the cargo tank of the carrier vessel.

The support vessel may further comprise at least one hose for extending between the carrier vessel and the support vessel for communicating the gas comprising VOCs from the cargo tank of the carrier vessel to the processing facility on the support vessel.

The support vessel may further comprise a dynamic positioning system, e.g. for positioning and controlling the heading of the support vessel with respect to the carrier vessel. The support vessel may further comprise propulsion and/or thruster means for steering or positioning the vessel with a desired heading or distance from the carrier vessel, e.g. under control of the dynamic positioning system. The dynamic positioning system may be as described in relation to the first aspect of the invention.

According to a third aspect of the invention, there is provided a method comprising the steps of: loading fluid hydrocarbon cargo into at least one cargo tank of a carrier vessel; providing at least one support vessel to facilitate in said loading step, the support vessel provided with VOC recovery means onboard; recovering volatile organic compounds, VOCs, the VOCs being produced from the cargo tank in the step of loading the cargo tank; supplying gas comprising volatile organic compounds, VOCs, from the cargo tank of the carrier vessel to the VOC recovery means on the support vessel through at least one hose which extends between the carrier vessel and the support vessel.

The method may further comprise any one or more of the steps of: disconnecting the support vessel from the carrier vessel by disconnecting the connecting hose from either or both of the support vessel and the carrier vessel; transporting the loaded fluid hydrocarbon cargo across sea on the carrier vessel; and using the support vessel to facilitate in loading another carrier vessel which is moored at the same or another mooring.

Advantageously, the support vessel preferably is not moored, and more specifically, preferably the support vessel is not moored to the carrier vessel, e.g. no mooring lines between the two vessels, even when the hose may be connected and be in use between the support vessel and the carrier vessel.

The method may further comprise: storing liquid comprising VOCs from the recovery means in at least one storage tank on the support vessel; discharging at least some of the liquid from the storage tank of the support vessel; and transmitting the discharged liquid through tubing to at least one onshore recipient.

The recovery means may comprise a processing facility on the support vessel, and the method may then further comprise either or both: operating the processing facility to liquefy VOCs from the gas supplied to the processing facility; and storing liquid comprising the liquefied VOCs in at least one storage tank on the support vessel. The method may further comprise liquifying the VOCs of the gas in the processing facility by cooling and condensing the gas to obtain VOC condensate liquid.

Any of the various aspects may have one or more further features as set out in any one or more of the independent claims as appended here to, or anywhere else herein.

Various advantages of the different aspects and examples of the invention will be apparent from throughout the present specification.

DRAWINGS AND SPECIFIC DESCRIPTION

The various aspects of the invention will now be described, by way of example only, with reference to the accompanying drawings, in which.

Figure 1:
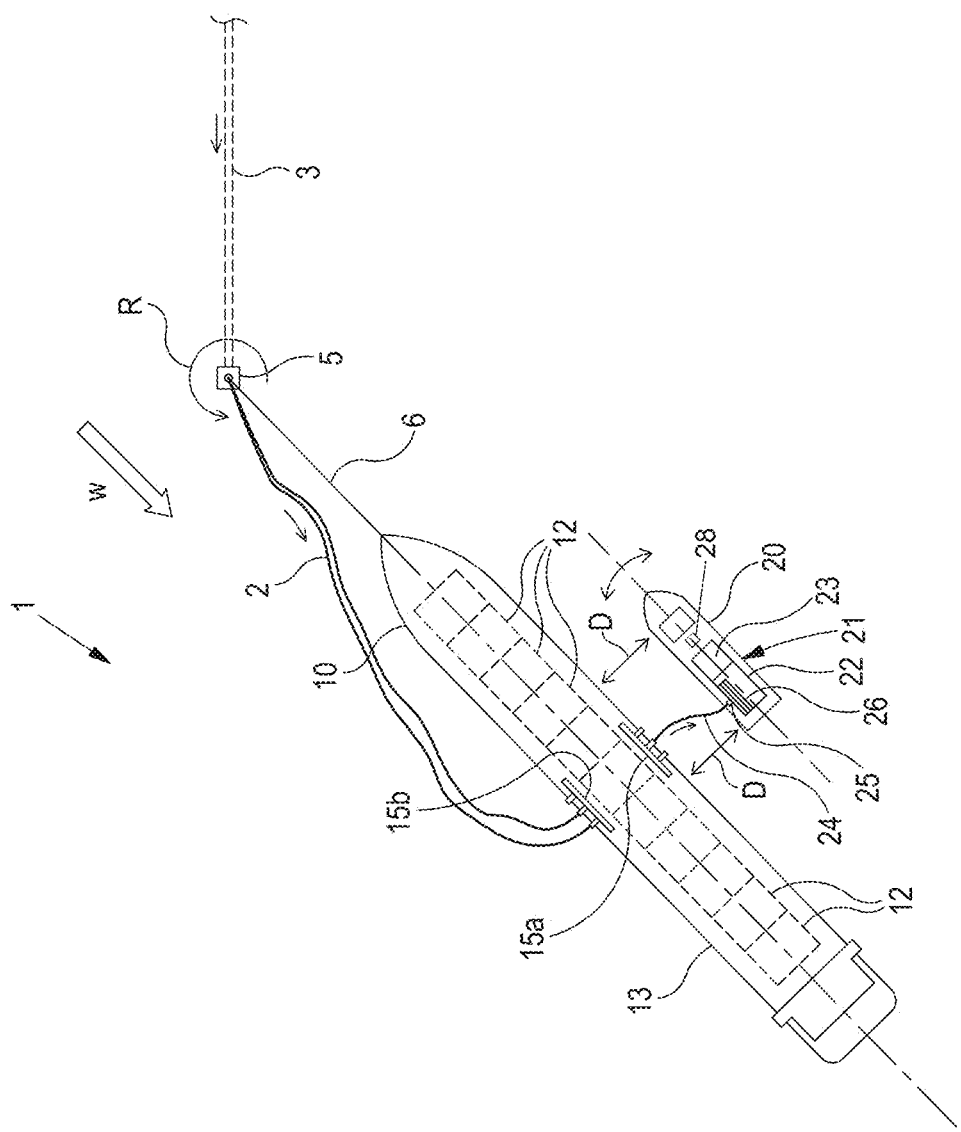
FIG. 1 is a schematic overhead view of an example system for loading crude oil onto a crude oil carrier.

The system 1 of FIG. 1 includes a crude oil carrier 10 (constituting a carrier vessel) which in this example is moored to an offshore mooring 5 by a tether 6.

Flexible hoses 2 connect between the mooring 5 and midship manifold 15$b$ of the carrier 10. The hoses 2 are buoyant and over part of their length float on the water. Oil to be loaded onto the carrier 10 is communicated from the supply pipeline 3 through the hoses 2 and into cargo tanks 12 in the hull 13 of the carrier 10.

The system 1 further includes a support vessel 20. The support vessel 20 is positioned alongside the moored carrier 10. The support vessel 20 is spaced apart from one side of the carrier 10 by a distance D and is controlled to have a parallel heading to that of the carrier 10 by use of a Dynamic Positioning system 28 of the vessel 20.

The support vessel 20 has a VOC recovery means 21 including an onboard processing facility 22 for recovering volatile organic compounds (VOC). To facilitate this, the system includes a supply hose 24 for communicating gas comprising VOCs from the cargo tanks 12 of the carrier vessel to the recovery means 21 on the support vessel. The supply hose 24 extends between the carrier 10 and the support vessel 20. One end of the supply hose 24 in this example is connected to a midship manifold 15$a$ of the carrier 10 and the other end of the supply hose 24 in this example is connected to an inlet pipe 25 of the processing facility 22. The hose 24 is flexible and stored on a reel 26 on the support vessel 20.

The processing facility 22 receives the gas and is operable to liquify the VOCs into liquid, e.g. by compressing and condensing the various VOC components of the gas. VOC recovery technology such as that available from Wartsila can be provided on the support vessel 22 for this purpose. The VOC recovery means 21 includes a storage tank 23 for storing the produced liquid, allowing it to be transported onward across sea onboard the vessel.

The liquid is temporarily stored in the tank 23 onboard the support vessel 20. The liquid is later discharged, for example it may be transported and offloaded to land when in port or transferred to an onward transhipment facility.

Thus, the VOCs which are produced from the cargo tanks 12 during loading of the carrier 10 are recovered without releasing the VOC gases into the atmosphere. The liquid comprising liquefied VOCs is stored on the support vessel 20 and can be later discharged safely at a suitable facility onshore or elsewhere.

By providing the VOC recovery means 21 on the support vessel 20, the facility 22 can be used for the time needed during loading, then disconnected readily for use with another incoming crude oil carrier, simply by disconnecting the end of the hose 24. The hose 24 is preferably stored on the support vessel 20 on the reel 26, in which case the end of the hose attached at the midship manifold 15$a$ may be disconnected. The crude oil carrier 10 can in the meantime set off across sea to the desired destination for the crude oil. The support vessel 20 can then remain on standby or travel to port for discharge of the liquid VOC, e.g. near the location of the mooring 5, awaiting the arrival of another crude oil carrier at the mooring 5. As soon as the other crude oil carrier is moored, the support vessel 20 can be utilised again for recovery of VOC gas when the next crude oil carrier is being loaded. Thus, the VOC processing facility 22 may advantageously be put into operational use again before the original carrier 10 has reached its destination. The VOC recovery means 21 may thus be conveniently available for operation on a repeated basis with new carriers.

The crude oil carrier 10 is bow moored to the mooring 5. The carrier 10 is moored rotationally to the mooring 5. The tether 6 extends from the bow of the transport vessel to the mooring 5. The carrier 10 can then move i.e. "weathervane" according to the forces imparted from the environment rotationally about the mooring 5. The crude oil carrier 10 can then weathervane so as to align parallel to and with the bow arranged toward the direction W of environmental force, e.g. the cumulative force of wind, waves, and current acting upon the vessel. However, any other suitable moorings for the crude oil carrier could be used.

The support vessel 20 has a dynamic positioning system 28, preferably DP2, positioning system whereby it can keep a position and heading relative to the crude oil carrier 10 that is substantially constant. The support vessel 20 has thrusters and steering which operate under control of the dynamic positioning system 28 to maintain the position and heading. If urged by environmental forces away from the desired position, the dynamic positioning system 28 operates to bring the support vessel 20 back to its intended, e.g. pre-programmed, position and heading relative to the carrier 10. If the carrier vessel moves during loading operations, e.g. upon weathervaning, the support vessel 20 can be moved correspondingly by operation of the dynamic positioning system 28.

This can facilitate arranging the support vessel 20 a safe distance away from the carrier 10 but near enough that the hose 24 can be connected. Furthermore, the support vessel 20 is mobile and readily moved away upon disconnecting and removing the hose 24 the vessel 20 is ready for further use.

Conveniently, the support vessel 20 is a platform supply vessel (PSV).

The support vessel 20 is not moored to the carrier vessel 10. The necessary positioning is provided by virtue of the operability of the dynamic positioning system 28 and steering thrusters for maneuvering the support vessel. No mooring lines are used or required between the support vessel and the carrier vessel.

The only connection between the carrier vessel 10 and the support vessel is the hose 24. This can be quickly released and allow the support vessel 20 to be quickly disengaged from the carrier 10 in an emergency situation, e.g. fire, or for other reason, such as if the weather suddenly deteriorates to make it unfeasible to continue loading and recovering released VOC gases. However, the arrangement can facilitate continuing operations even when weather is difficult and otherwise could hinder the use of mooring lines.

In this example, the oil to be loaded is transported to the mooring 5 through a seabed pipeline 3. The mooring 5 has conduits arranged to convey the fluid from the pipeline 3 to the hoses 2 which in turn connect to a midship manifold 15b of the carrier 10 for loading the carrier 10.

Figure 2:
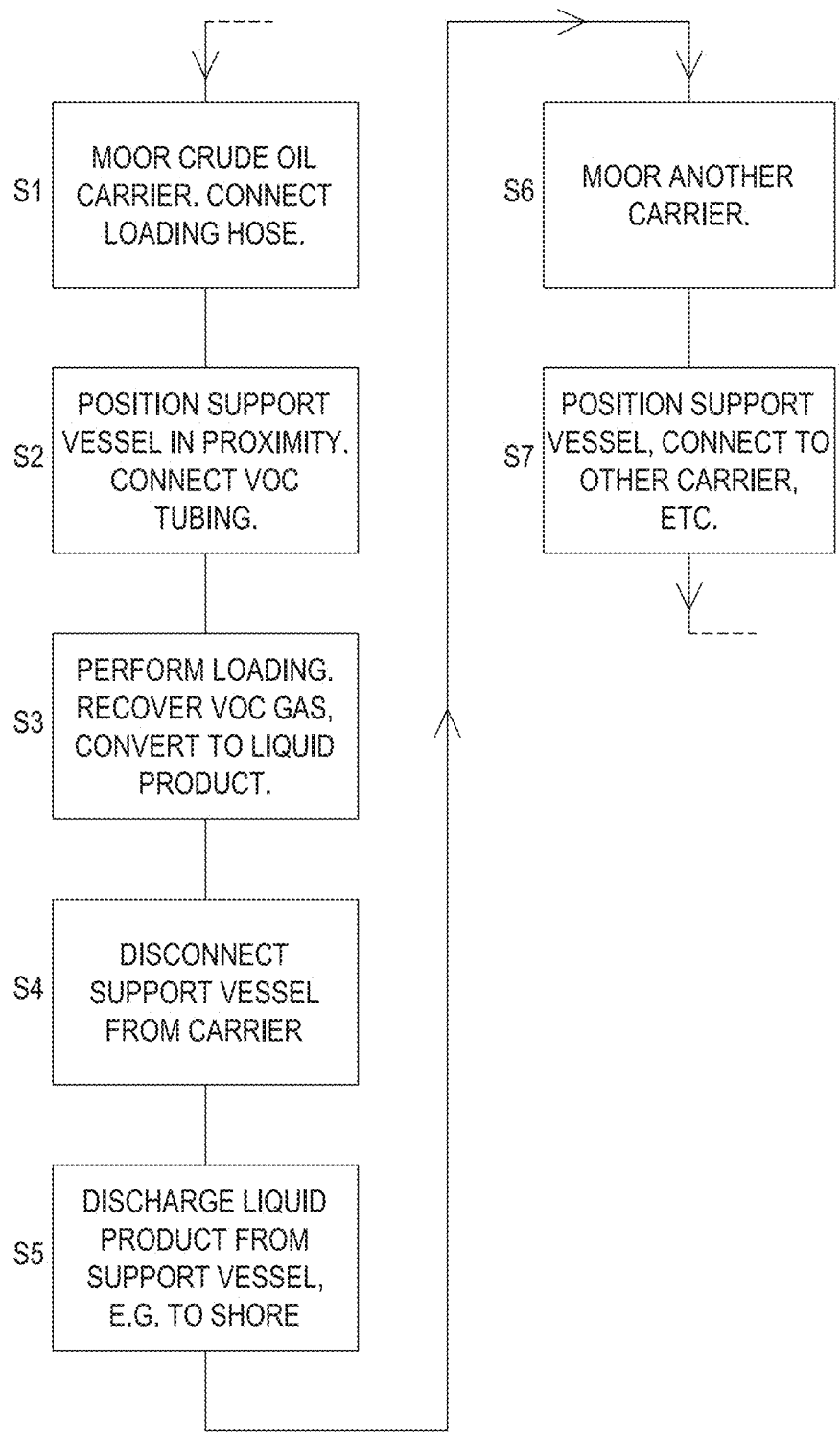
FIG. 2 is a block diagram of a method of loading crude oil carriers for transport.

Referring to FIG. 2, a method has various steps as follows, using the same numbering of steps S1 to S7 as indicated in the figure:

S1. The crude oil carrier 10 is moored. The load tubing 2 is connected to the carrier 10.

S2. The support vessel 20 is moved into position alongside the carrier 10, and the supply hose 24 is connected to the carrier.

S3. Loading of crude oil is performed. As loading takes place, VOC gases or vapour from the cargo tanks of the carrier are displaced from the tanks and conveyed through the connected hose 24 to the processing facility 22 of the support vessel 20 and the VOCs are processed. The VOC components of the gas or vapour are turned into liquid, e.g. condensed, and the liquid is stored in one or more tanks 23 on the support vessel.

S4. Once loading is complete, the support vessel 20 and the tubing 24 is disconnected from the carrier 10. The carrier 10 disconnects from the mooring and travels across sea to transport the loaded crude oil to the destination.

S5. The liquid is typically discharged from the support vessel, e.g. if full or if greater capacity is required before further operation of the support vessel. For example, the support vessel 20 travels to port and the tank of stored liquid is discharged by transferring liquid out of the tank 23 to another facility or recipient. The liquid comprising VOCs which is discharged is typically reinjected into crude oil or utilized for other purposes onshore or alternatively is transhipped. The support vessel 20 may then return to be positioned near the mooring or near another mooring and is then used in connection with loading another carrier. The support vessel 20 can stay near the mooring or berth that has been vacated and/or may travel to another nearby mooring location without discharging the tanks of liquid, ready for further use, if the tanks 23 on the support vessel 20 have sufficient capacity for accommodating expected liquid produced in that further use.

S6 & S7. Another crude oil carrier is moored at the same or another mooring or berth. The support vessel 20 is moved into position alongside the other carrier, the hose 24 is connected and the steps S1 to S5 are then repeated in respect of the other carrier, making use of the support vessel 20 to recover the VOCs when loading the crude oil onto the carrier.

Figure 3:
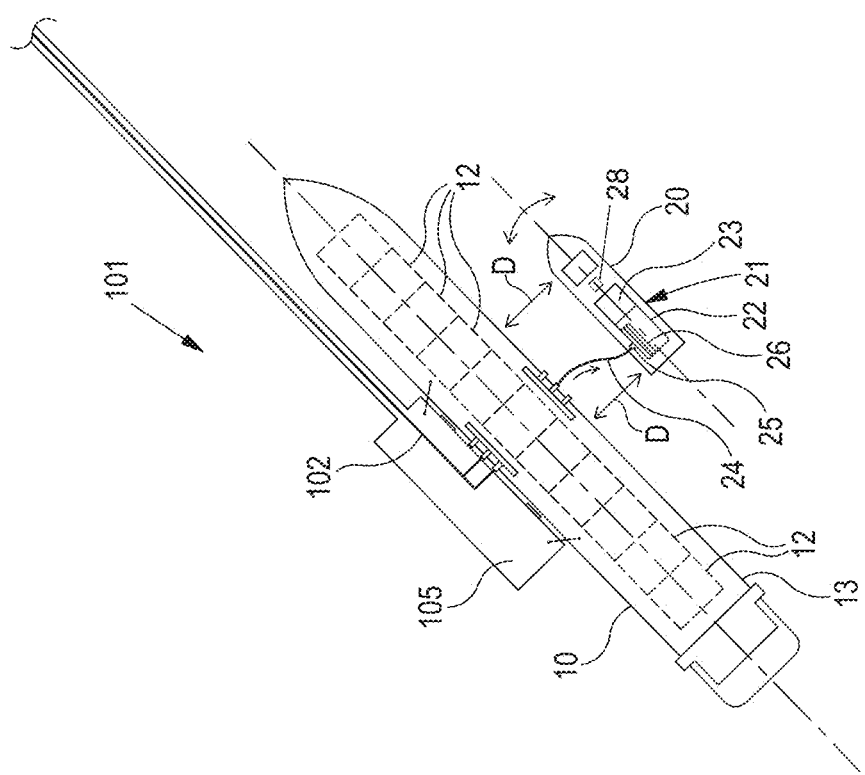
FIG. 3 is a schematic overhead view of an example where the carrier vessel is moored to a Sea Island.

In FIG. 3, the support vessel 20 is used in connection with the crude oil carrier 10 moored to a Sea Island 105. Loading then takes place through the pipelines 102 from the Sea Island 105. The Sea Island is a fixed structure and connected to a jetty extending typically from shore. The VOC gases are recovered by the processing facility 22 onboard the support vessel 20 in corresponding manner as for other moorings of the carrier 10.

The use of the support vessel 20 with the VOC recovery means 21 onboard can facilitate efficient and regular loading of large crude oil tankers 10, each of which can take up to 2 days, e.g. as may typically be desired 4 to 6 times per week, with full VOC handling. The system allows providing the VOC service to multiple tankers from one support vessel, allowing rapid and more convenient adoption of VOC capture that is especially suited for production regions where transport of large quantities of produced oil over long distances across sea may be needed. Tankers can advantageously be filled without modification of the ship, with standard equipment sufficient, as the support vessel 20 merely connects onto the mid ship manifold with the hose 24. Operations using the support vessel and system as described above may allow large amounts of VOC to be recovered and it is estimated over a fleet of 50 ships that the solution could provide reductions in yearly emissions to the atmosphere compared with traditional operations of up to 30% $CO_2$ equivalence of current day emissions from mainland Norway.

Various modifications and improvements may be made without departing from the scope of the invention herein described.

The invention claimed is:

1. A system for assisting in loading fluid hydrocarbon cargo, the system comprising:

a carrier vessel for carrying fluid hydrocarbon cargo across sea, the hydrocarbon cargo to be loaded into at least one cargo tank of the carrier vessel;

a support vessel;

VOC (volatile organic compound) recovery means on the support vessel for recovering VOCs, the VOCs being produced from the at least one cargo tank in loading the at least one cargo tank, in use; and at least one hose extending between the carrier vessel and the support vessel for communicating gas comprising VOCs through the at least one hose from the at least one cargo tank of the carrier vessel to the VOC recovery means on the support vessel.

2. The system as claimed in claim 1, wherein the support vessel has a dynamic positioning system for positioning and controlling a heading of the support vessel with respect to the carrier vessel.

3. The system as claimed in claim 1, wherein the support vessel is a platform supply vessel (PSV).

4. The system as claimed in claim 1, further comprising an offshore mooring, wherein the carrier vessel is moored to the offshore mooring.

5. The system as claimed in claim 1, wherein the carrier vessel is a crude oil carrier and the fluid hydrocarbon cargo comprises crude oil.

6. The system as claimed in claim 1, wherein the VOC recovery means comprises a VOC processing facility for processing the VOCs from the gas.

7. The system as claimed in claim 6, wherein the VOC recovery means further comprises at least one storage tank for storing liquid comprising VOCs.

8. The system as claimed in claim 6, wherein the VOC processing facility is configured to liquefy the VOCs from the gas to obtain a liquid comprising liquefied VOCs.

9. A support vessel for assisting in a process in which fluid hydrocarbon cargo is loaded into at least one cargo tank of a carrier vessel, the carrier vessel to transport the fluid hydrocarbon cargo across sea, the support vessel comprising: onboard VOC (volatile organic compound) recovery means for recovering VOCs, the VOCs being produced from the at least one cargo tank in loading the at least one cargo tank of the carrier vessel, wherein the onboard VOC recovery means comprises a VOC processing facility for processing the VOCs from supplied gas and at least one storage tank for storing liquid comprising VOCs, the VOC processing facility being configured to liquefy the VOCs from the supplied gas to obtain a liquid comprising liquefied VOCs;

at least one hose for extending between the carrier vessel and the support vessel for communicating the supplied gas comprising VOCs from the at least one cargo tank of the carrier vessel to the VOC processing facility on the support vessel; and a dynamic positioning system for positioning and controlling a heading of the support vessel with respect to the carrier vessel.

10. A method for assisting in loading fluid hydrocarbon cargo onto a carrier vessel, the method comprising the steps of:

loading fluid hydrocarbon cargo into at least one cargo tank of the carrier vessel;

providing at least one support vessel having VOC (volatile organic compound) recovery means onboard;

recovering VOCs, the VOCs being produced from the at least one cargo tank in the step of loading the fluid hydrocarbon cargo into the at least one cargo tank of the carrier vessel; and supplying gas comprising VOCs from the at least one cargo tank of the carrier vessel to the VOC recovery means on the at least one support vessel through at least one connecting hose which extends between the at least one carrier vessel and the support vessel.

11. The method as claimed in claim 10, wherein the carrier vessel is moored at a mooring, and which further comprises the steps of:

disconnecting the at least one support vessel from the carrier vessel by disconnecting the at least one connecting hose from either or both of the at least one support vessel and the carrier vessel;

transporting the loaded fluid hydrocarbon cargo across sea on the carrier vessel; and using the at least one support vessel to facilitate in loading another carrier vessel which is moored at the mooring or at another mooring.

12. The method as claimed in claim 10, which further comprises:

storing liquid comprising VOCs from the VOC recovery means in at least one storage tank on the at least one support vessel;

discharging at least some of the liquid comprising VOCs from the at least one storage tank of the at least support vessel; and transmitting the liquid comprising VOCs that was discharged through tubing to at least one onshore recipient.

13. The method as claimed in claim 10, wherein the VOC recovery means comprises a processing facility, and the method further comprises:

supplying gas comprising VOCs to the processing facility;

operating the processing facility to liquefy VOCs from the gas supplied to the processing facility; and storing liquid comprising liquefied VOCs in at least one storage tank on the at least one support vessel.

14. The method as claimed in claim 13, which further comprises liquifying the VOCs of the gas by cooling and condensing the gas to obtain VOC condensate liquid.

15. The system as claimed in claim 2, wherein the support vessel is a platform supply vessel (PSV).

16. The system as claimed in claim 7, wherein the VOC processing facility is configured to liquefy the VOCs from the gas to obtain a liquid comprising liquefied VOCs.

17. The method as claimed in claim 11, which further comprises:

storing liquid comprising VOCs from the VOC recovery means in at least one storage tank on the at least one support vessel;

discharging at least some of the liquid comprising VOCs from the at least one storage tank of the at least one support vessel; and transmitting discharged liquid comprising VOCs through tubing to at least one onshore recipient.

18. A support vessel operable in the system of claim 1, wherein the support vessel comprises the VOC recovery means and the VOC recovery means comprises an onboard VOC recovery means, and wherein the support vessel is connected to the carrier vessel only via the at least one hose and without mooring to the carrier vessel for communicating the VOCs through the at least one hose.

19. The support vessel as claimed in claim 18, further comprising a processing facility on the support vessel for processing the VOCs from the gas comprising VOCs.

20. The support vessel as claimed in claim 19, further comprising a dynamic positioning system for positioning and controlling a heading of the support vessel with respect to the carrier vessel.

* * * * *